(12) United States Patent
Tochadse (10) Patent No.: US 10,070,506 B2
(45) Date of Patent: Sep. 4, 2018

(54) IGNITOR-ARRANGEMENT

(71) Applicant: KONINKLIJKE PHILIPS N.V., Eindhoven (NL)

(72) Inventor: Gennadi Tochadse, Aachen (DE)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 15/128,072

(22) PCT Filed: Apr. 7, 2015

(86) PCT No.: PCT/EP2015/057453
§ 371 (c)(1),
(2) Date: Sep. 21, 2016

(87) PCT Pub. No.: WO2015/155156
PCT Pub. Date: Oct. 15, 2015

(65) Prior Publication Data
US 2017/0094758 A1 Mar. 30, 2017

(30) Foreign Application Priority Data

Apr. 7, 2014 (EP) .................................... 14163652

(51) Int. Cl.
*H05B 37/02* (2006.01)
*H05B 41/292* (2006.01)
*H05B 41/288* (2006.01)

(52) U.S. Cl.
CPC ..... *H05B 41/2926* (2013.01); *H05B 41/2881* (2013.01); *Y02B 20/204* (2013.01)

(58) Field of Classification Search
CPC ............ H05B 41/2881; H05B 41/2926; Y02B 20/204
See application file for complete search history.

(56) References Cited

U.S. PATENT DOCUMENTS 4,866,347 A * 9/1989 Nuckolls .............. H05B 41/046
315/104
4,914,354 A * 4/1990 Hammer ................ H05B 41/08
315/104

(Continued)

FOREIGN PATENT DOCUMENTS

CN        2317594        5/1999
CN     101112128 A      1/2008

(Continued)

OTHER PUBLICATIONS

EPO as ISA, International Search Report and Written Opinion dated Oct. 1, 2015 from International Application No. PCT/EP2015/057453, filed Apr. 7, 2015, 14 pages.

(Continued)

*Primary Examiner* — Alexander H Taningco
*Assistant Examiner* — Kurtis R Bahr (57) ABSTRACT

The invention describes an ignitor arrangement (1) for a high-intensity discharge lamp (2), which ignitor arrangement (1) comprises a first pair of input terminals (101, 102) for applying an ignition voltage to the ignitor arrangement (1); a second pair of input terminals (101, 103) for applying an input drive voltage to the ignitor arrangement (1); and a discharge resistor (10) arranged in the interior (100) of the ignitor arrangement (1) and connected across the first input terminal pair (101, 102), which discharge resistor (10) is realized as a temperature-dependent resistor (10). The invention also describes a lamp driver (3) realized to drive a high-intensity discharge lamp (2); a lighting arrangement (4); and a method of driving a high-intensity discharge lamp (2).

16 Claims, 5 Drawing Sheets

(56) References Cited

U.S. PATENT DOCUMENTS

| | | | | |
|---|---|---|---|---|
| 5,428,268 A | * | 6/1995 | Melis | H05B 41/2888 |
| | | | | 315/247 |
| 5,453,666 A | * | 9/1995 | Brown | H05B 37/03 |
| | | | | 315/127 |
| 5,543,690 A | * | 8/1996 | Bernicke | H05B 41/2988 |
| | | | | 315/209 R |
| 5,886,481 A | | 3/1999 | Flory, IV | |
| 5,977,723 A | * | 11/1999 | Yoon | H02M 1/425 |
| | | | | 315/209 R |
| 6,046,551 A | | 4/2000 | Kita | |
| 6,072,283 A | | 6/2000 | Hedrei et al. | |
| 7,019,466 B2 | * | 3/2006 | Batz | H05B 41/042 |
| | | | | 315/288 |
| 7,333,313 B2 | * | 2/2008 | Bouchard | H05B 41/2926 |
| | | | | 315/307 |
| 7,746,005 B2 | * | 6/2010 | Weinert | H05B 41/042 |
| | | | | 315/209 CD |
| 8,063,580 B2 | * | 11/2011 | Saveliev | H05B 41/2921 |
| | | | | 315/209 CD |
| 2002/0021097 A1 | * | 2/2002 | Ito | H05B 41/288 |
| | | | | 315/291 |
| 2003/0209998 A1 | | 11/2003 | Schmitt | |
| 2005/0067979 A1 | | 3/2005 | Haruna et al. | |
| 2006/0012309 A1 | * | 1/2006 | Monch | H05B 41/2928 |
| | | | | 315/112 |
| 2007/0267981 A1 | * | 11/2007 | Peng | H05B 41/28 |
| | | | | 315/291 |
| 2008/0129205 A1 | | 6/2008 | Weinert et al. | |
| 2008/0185981 A1 | * | 8/2008 | Mendoza | H05B 41/042 |
| | | | | 315/309 |
| 2011/0248637 A1 | * | 10/2011 | Mitsuyasu | H05B 33/0815 |
| | | | | 315/178 |
| 2012/0094151 A1 | * | 4/2012 | Kim | H02J 7/0016 |
| | | | | 429/50 |
| 2013/0342107 A1 | * | 12/2013 | Haacke | H05B 41/2926 |
| | | | | 315/118 |
| 2015/0181682 A1 | * | 6/2015 | Shet | H05B 33/0806 |
| | | | | 315/127 |

FOREIGN PATENT DOCUMENTS

| | | |
|---|---|---|
| CN | 201349130 | 11/2009 |
| DE | 10101931 A1 | 8/2001 |
| EP | 2244537 A2 | 10/2010 |
| FR | 2775414 A | 8/1999 |
| WO | 2006085279 A1 | 8/2006 |
| WO | 2010136918 A1 | 12/2010 |

OTHER PUBLICATIONS

Extended European Search Report dated Sep. 25, 2014, European Patent Application No. 14163652.2, 5 pages.

First Office Action dated May 29, 2018, China Patent Application No. 201580017912.2, 16 pages.

* cited by examiner

IGNITOR-ARRANGEMENT

CROSS-REFERENCE TO RELATED APPLICATIONS

The present application is a § 371 application of International Application No. PCT/EP2015/057453 filed on Apr. 7, 2015 and entitled "IGNITOR-ARRANGEMENT," which claims priority to European Patent Application No. 14163652.2, filed Apr. 7, 2014. Applications PCT/EP2015/057453 and EP14163652.2 are incorporated herein.

FIELD OF THE INVENTION

The invention describes an ignitor arrangement for a high-intensity discharge lamp; a lamp driver; a lighting arrangement; and a method of driving a high-intensity discharge lamp.

BACKGROUND OF THE INVENTION

A high-intensity discharge lamp (HID lamp)—such as an automotive Xenon lamp for a front beam—may be realised together with an ignitor, i.e. the lamp is mounted to the ignitor housing and is electrically connected to components inside the ignitor housing. Lamp and ignitor may be realised as a single product, with the lamp mounted directly to a housing containing the ignitor components. The ignitor housing generally has a connection interface for connecting a number of electrical leads to an electronic lamp driver. The ignitor generally comprises a transformer, an ignition capacitor, a voltage limiter such as a clipping diode, a discharge resistor and a spark gap. The purpose of the ignitor is to establish a discharge arc across the tips of the electrodes inside the discharge chamber of the lamp (also referred to as a "burner") so that normal or steady-state operation can begin. A known type of ignitor such as an asymmetrical ignitor comprises a pair of input terminals for applying the ignition voltage, and a pair of terminals for applying a drive voltage to the lamp during steady-state operation.

The lamp driver is used to regulate the lamp power. In some situations, for example night-time driving outside of a built-up area, more light on the road is desirable for safety reasons. To this end, some electronic lamp drivers for automotive HID lamps are designed and manufactured to be able to increase the lamp power in such a situation. Furthermore, lamps may be designed to consume more power, for example in an upper power limit allowed by the appropriate regulation. Increasing the lamp power for whatever reason leads to an increase in the temperature inside the ignitor housing, and the components of the ignitor may become damaged as a result. For example, if the lamp is driven at a boosted or higher power that is greater than the lamp's nominal power, the ignitor components are subjected to increased thermal stress. The heat originates from the burner, which is physically very close to the ignitor housing. It is not uncommon for the ignitor components to reach temperatures close to 150° C., which is the usual specification limit for such components. All of the components mentioned above can fail due to overheating. Clearly, the lifetime of the components and therefore of the ignitor are reduced significantly if the ignitor is allowed to become too hot. Other problems associated with a too-hot ignitor are that re-ignition of an overheated ignitor ('hot re-strike') can fail, or high-voltage isolation of the ignitor can be reduced and can cause re-ignition failures. Another factor that encourages the development of high temperatures in the ignitor is the trend towards more compact headlamp assemblies.

In one approach to dealing with this problem, the power applied to the lamp is reduced in order to lower the temperature in the ignitor. However, in order to regulate the power, some information about the ignitor temperature is required. Therefore, in one known approach, cf. US20050067979A1, EP2244537A2, US6072283A, and WO2010136918A1, a temperature sensor can be arranged inside the ignitor housing and connected by electrical leads to an external module that monitors the temperature development and regulates the lamp power accordingly. However, this solution requires an alteration to an existing interface between the ignitor and the lamp driver in order to accommodate the additional electrical leads, and is therefore unattractive from a commercial point of view. In an alternative approach, heat-dissipating elements can be mounted to the outside of the ignitor housing in order to draw some heat away from the ignitor and its components, and/or a ventilator may be used to blow cool air over the ignitor. However, such elements are bulky and therefore unattractive and also add to the overall cost of a lighting arrangement with such an ignitor.

Therefore, it is an object of the invention to provide an improved way of operating a high-intensity discharge lamp that avoids the problems outlined above.

SUMMARY OF THE INVENTION

The object of the invention is achieved by the ignitor arrangement of claim 1; by the lamp driver of claim 5; by the lighting arrangement of claim 9; and by the method of claim 10 of driving a high-intensity discharge lamp.

According to the invention, the ignitor arrangement for a high-intensity discharge lamp comprises a first pair of input terminals for applying an ignition voltage to the ignitor arrangement; a second pair of input terminals for applying an input drive voltage to the ignitor arrangement; and a discharge resistor arranged in the interior of a housing of the ignitor arrangement and connected across the first input terminal pair, characterized in that the discharge resistor is realised as a temperature-dependent resistor.

Only the elements of the ignitor arrangement that are relevant to the invention have been listed in the above, and it will be understood that the ignitor arrangement will comprise further elements for igniting the lamp, as well as a pair of output terminals for applying an output drive voltage to the lamp.

An advantage of the ignitor arrangement according to the invention is that the temperature-dependent resistor can be used to obtain information directly relating to the temperature in the interior of the ignitor arrangement. Since the resistance of the temperature-dependent resistor changes as temperature increases or decreases, and since resistance can be measured relatively easily, the temperature-dependent resistor can be used to determine the temperature in the ignitor, and the operating power of the lamp can be regulated accordingly. For example, the lamp power can be regulated by adjusting the current supplied to the lamp via the second pair of input terminals.

An ignitor such as an asymmetrical ignitor for a HID lamp incorporates a discharge resistor, which serves the purpose of providing a discharge path for the capacitor that is used to generate a spark across a spark gap. In the ignitor arrangement according to the invention, this functionality of the discharge resistor remains unchanged, and this discharge resistor now also fulfils an additional function, namely that of providing favourably accurate feedback regarding the temperature inside the ignitor. In this way, a regulation of the temperature in the interior of the ignitor arrangement can be achieved without having to alter or adapt an existing ignitor/driver interface or the actual ignitor design. To obtain temperature-related feedback, the ignitor arrangement according to the invention favourably makes use of the ignition terminal, which is no longer required for any specific purpose during steady-state operation of the lamp. In contrast to the prior art solutions that often make use of temperature sensors which must additionally be built into the ignitor and which require an additional electrical connection to a control unit, the ignitor arrangement according to the invention does not need any additional component or sensing arrangement, and no alteration is needed to an interface between the ignitor and the driver. Therefore, the ignitor arrangement according to the invention is favourably economical to manufacture. Furthermore, the ignitor arrangement according to the invention is characterized by an extended lifetime since the components inside the ignitor housing can be protected from heat damage, as will be explained below.

According to the invention, the lamp driver is realised to drive a high-intensity discharge lamp, preferably an automotive lamp, and comprises an ignitor arrangement according to the invention; an ignition circuit realised to apply an ignition voltage across the first pair of input terminals of the ignitor arrangement; a drive circuit realised to apply a drive voltage across the second pair of input terminals of the ignitor arrangement; a temperature evaluation unit realised to determine a temperature in the interior of the ignitor arrangement; and a control unit for regulating the lamp's operating power on the basis of the determined temperature.

An advantage of the lamp driver according to the invention is that it can easily be provided with information relating to the momentary thermal situation inside the ignitor, so that it can respond appropriately. For example, in case of interior conditions that are too hot, the lamp driver can respond by lowering the lamp power. On the other hand, if the temperature inside the ignitor appears to have some 'headroom', and additional lamp power would be of advantage, the lamp driver can increase the lamp power without risking thermal damage to the ignitor components.

According to the invention, the lighting arrangement comprises an ignitor arrangement according to the invention arranged in the interior of a housing; and a high-intensity discharge lamp mounted onto the housing, whereby an electrode pair of the lamp is connected to the output terminal pair of the ignitor arrangement.

An advantage of the lighting arrangement according to the invention is that it can have a significantly longer lifetime than a comparable lighting arrangement without such a temperature-dependent resistor incorporated in the ignitor interior, and that this additional lifetime can be obtained without having to make any alterations on an interface between the lighting arrangement and a lamp driver.

According to the invention, the method of driving a high-intensity discharge lamp comprises the steps of connecting the lamp to an ignitor arrangement according to the invention; applying an ignition voltage across the first pair of input terminals of the ignitor arrangement in order to ignite the lamp; applying a drive voltage across the second pair of input terminals of the ignitor arrangement after lamp ignition; determining a temperature in the interior of the ignitor arrangement; and regulating the operating power on the basis of the determined temperature.

An advantage of the method according to the invention is that the temperature in the interior of the ignitor arrangement can be established or determined in a very simple and convenient manner, without having to arrange temperature sensors inside the ignitor. The lamp driver can, at any time, determine the temperature inside the ignitor and can regulate the lamp power accordingly if necessary. Furthermore, the method according to the invention allows the lamp driver to determine whether it is safe to drive the lamp at a higher power, should this be desired, since it is easy to determine whether the ignitor interior temperature is low enough to be able to deal with an increased burner temperature.

The dependent claims and the following description disclose particularly advantageous embodiments and features of the invention. Features of the embodiments may be combined as appropriate. Features described in the context of one claim category can apply equally to another claim category.

In the following, but without restricting the invention in any way, it may be assumed that the lamp or burner is a high-intensity discharge (HID) lamp of the type used in an automotive application, such as a front headlamp, and the terms "lamp" and "burner" may be used interchangeably in the following. An example of such a burner might be a Xenon HID lamp, which can be mounted directly to an ignitor. A lighting arrangement comprising such an HID lamp and ignitor generally has a defined interface with a connector for mating with a connector of a lamp driver, so that the entire lighting arrangement can be easily replaced while ensuring that the burner is placed in a defined orientation or position in the headlamp. In the context of the invention, the terms "temperature-dependent discharge resistor", "temperature-dependent resistor" and "thermistor" may be used interchangeably in the following.

There are a number of alternatives possible for the temperature-dependent discharge resistor. For example, a temperature-dependent resistor such as a negative temperature coefficient (NTC) thermistor could be used, or a positive temperature coefficient (PTC) thermistor, or a thermally sensitive silicon resistor, usually referred to as a silistor.

The resistance of a temperature dependent resistor alters with increasing temperature of the resistor. For example, the resistance of an NTC thermistor decreases with increasing temperature. The relationship between temperature and resistance is generally non-linear, or may be linear only over quite small temperature ranges. Usually, the relationship between resistance and temperature is described using a third-order approximation. However, no matter which type of temperature-dependent discharge resistor is used, it should have a certain value of resistance over a temperature range that is typical during operation of the lamp at rated power. Therefore, in a preferred embodiment of the invention, the temperature-dependent discharge resistor is chosen on the basis of a known temperature in the ignitor interior during normal operating conditions of the lamp. "Normal operating conditions" may be understood to mean operation at a nominal or rated lamp power within a certain ambient temperature range. The thermistor's value of resistance may be the same as the value of the resistor that it replaces. For example, if a resistor of 6 MΩ is being replaced by an NTC thermistor, and the nominal operating power of the lamp is 35 W, the thermistor should have a similar resistance at the temperatures that are typical for operation at that power level. Furthermore, the resistance of the thermistor should clearly change when the temperature in the ignitor increases as the lamp is driven at a higher power, so that such a change is detectable and can be used to deduce or estimate the temperature in the ignitor interior. Preferably, a thermistor is used that has a defined relationship between resistance and temperature at least over the temperature range from 25° C. to 150° C.

The temperature evaluation unit is preferably connected across the temperature-dependent discharge resistor, so that it can evaluate a voltage across the temperature-dependent discharge resistor and/or a current through the temperature-dependent discharge resistor. The information provided by the temperature-dependent discharge resistor—i.e. the change in resistance that follows a change in the temperature in the ignitor interior—can be evaluated or used in a number of ways. For example, a known voltage can be applied across the thermistor, and the resulting current through the thermistor can be measured, from which the resistance of the thermistor can be calculated. Since an essentially constant voltage is generally applied across the shared terminal and the ignition terminal during steady-state lamp operation in any case, this fact is put to good use by the lamp driver according to the invention. For example, in a particularly preferred embodiment of the invention, the current through the thermistor can be measured. Any change in resistance will result in a change in the measured current. For example, if the thermistor is an NTC thermistor, its resistance decreases with temperature. Therefore, a higher measured current will indicate a decrease in resistance and therefore also an increase in temperature. The altered resistance of the thermistor can be determined using Ohm's law and the values of known voltage and measured current, and the temperature inside the ignitor can subsequently be estimated with a suitable algorithm. For example, the lamp driver may be equipped with a processor that can compute the resistance of the thermistor on the basis of the measured current, and may then use this to solve a third-order approximation relating resistance to temperature, in order to calculate the momentary temperature. In a further preferred embodiment of the invention, however, the temperature evaluation unit is provided with information relating values of measured current to values of temperature. The information can be collected in advance during a calibration or test setup for a driver/ignitor combination. This information can be provided in the form of one or more look-up tables made available to the temperature evaluation unit of the lamp driver.

In a further embodiment, the current applied across the shared terminal and the ignition terminal may be essentially constant, and the temperature evaluation unit may be able to measure the voltage across the thermistor. Again, any change in resistance of the thermistor can be determined using Ohm's law and the values of measured voltage and known current, so that the temperature inside the ignitor can subsequently be estimated. In this case also, information relating voltage to temperature for a certain constant current can be collected for a particular thermistor during a calibration stage for a driver/ignitor combination, and provided in the form of one or more look-up tables made available to the temperature evaluation unit of the lamp driver.

Alternatively or in addition, the temperature evaluation unit can be realised to operate on the basis of a voltage divider. To this end, the temperature-dependent discharge resistor of the ignitor arrangement and a fixed-value resistor in the temperature evaluation unit could be connected as a voltage divider. A known voltage can be applied across the voltage divider, and the output voltage can be measured using the ignition terminal. The temperature in the ignitor interior can be monitored by the control unit in any suitable fashion. For example, the control unit may perform a temperature estimation every ten minutes or at any other suitable interval. In a preferred embodiment of the invention, the control unit is realised to essentially continuously monitor the temperature of the ignitor arrangement. In this way, the driver can respond quickly to a rapid increase in temperature in the ignitor interior space by regulating the lamp power. Equally, the control unit and driver can act to prevent the components of the ignitor from being exposed to overly high temperatures for any length of time.

The estimated or calculated ignitor interior temperature can be used to determine whether any adjustment should be made in how the lamp is being driven. Preferably, the step of regulating the lamp's operating power is performed such that the temperature in the interior of the ignitor arrangement is maintained below an upper temperature limit. For example, if the ignitor interior temperature is found to be close to this upper temperature limit, the lamp power can be reduced until the temperature drops to a satisfactory level. Equally, if the estimated temperature indicates a favourable amount of 'headroom' below the upper temperature limit, the lamp driver may increase the lamp's operating power if desired, while continuing to monitor the ignitor interior temperature.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
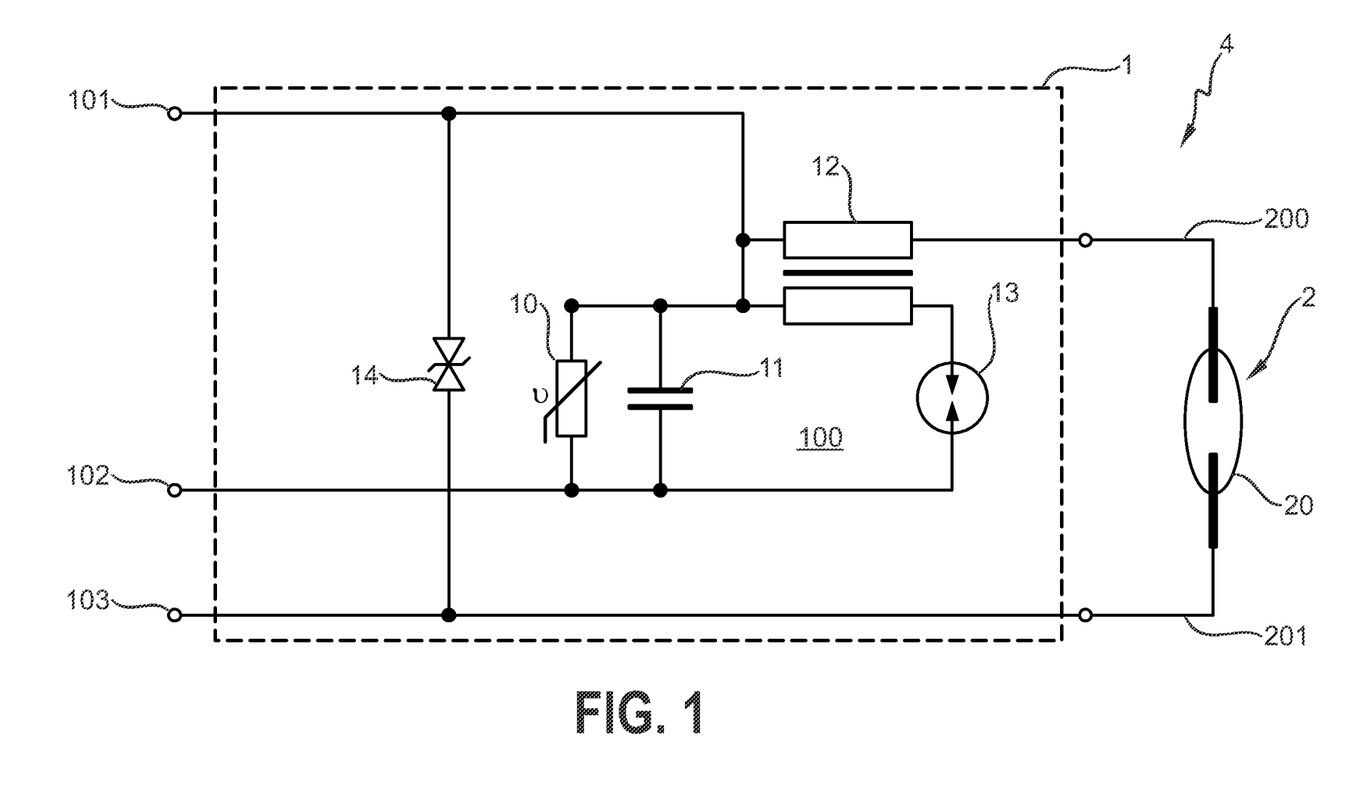
FIG. 1 shows an embodiment of a lighting arrangement according to the invention.

FIG. 1 shows an embodiment of a lighting arrangement 4 according to the invention, with a HID lamp burner 2 mounted to and electrically connected to an ignitor arrangement 1 according to the invention. The ignitor arrangement 1 is realised as an asymmetrical automotive ignitor 1, and the lamp 2 can be a HID burner 2 for a front lighting application. The lighting arrangement 4 can be realised, for example, as a D1 or D3 application. The ignitor arrangement 1 has a pair of input terminals 101, 102 to which an ignition voltage is applied (by a lamp driver, not shown here), and another pair of input terminals 101, 103 to which a drive voltage is applied. A first terminal 101 is shared, and an ignition terminal 102 is only required during ignition of the lamp 2. A HID lamp requires a brief intense voltage pulse to establish a discharge arc between the electrode tips, which face each other across a short gap in the discharge vessel 20 of the burner 2. The ignitor arrangement 1 comprises various electrical components to generate such a brief intense pulse to the lamp 2, which is connected by means of its electrode leads 200, 201 to the ignitor arrangement. Here, the components comprise a transformer 12, a spark gap 13, an ignition capacitor 11, and a discharge resistor 10. An ignition voltage is initially applied across the shared and ignition terminals 101, 102. Voltage builds up across the ignition capacitor 11, and therefore across the spark gap 13, until the voltage has reached a level which causes a breakdown across the spark gap 13. As soon as current flows (even if only briefly) through the primary winding of the transformer 12 and across the spark gap 13, current also flows through the secondary winding of the transformer 12, so that a high voltage ignition pulse appears across the electrodes of the lamp 2, and a discharge arc is established. At this point, the ignition terminal 102 is no longer required, the spark gap is once again non-conductive, and the ignition capacitor 11 can discharge through the discharge resistor 10 if the ignitor 1 is disconnected from the lamp driver. The diagram also shows a clipping diode arrangement 14 which serves to clip high voltage pulses between the second pair of input terminals to protect the lamp driver.

The components of the ignitor arrangement 1 are generally enclosed in a compact housing to which the lamp 2 is mounted. The burner of a Xenon HID lamp can easily reach temperatures in the range of 700° C. during operation at rated power, and this temperature can increase further when the lamp is driven above rated power (for example if more light is desired in a certain driving situation). Since the burner 20 is in close physical proximity to the ignitor housing, the temperature in the interior 100 of the ignitor will increase accordingly, and the components 10, 11, 12, 13, 14 will be exposed to high temperatures and may ultimately fail as a result of heat damage. Temperatures in the ignitor interior 100 reaching or exceeding 150° C. are critical for ignitors of the type described herein.

Figure 2:
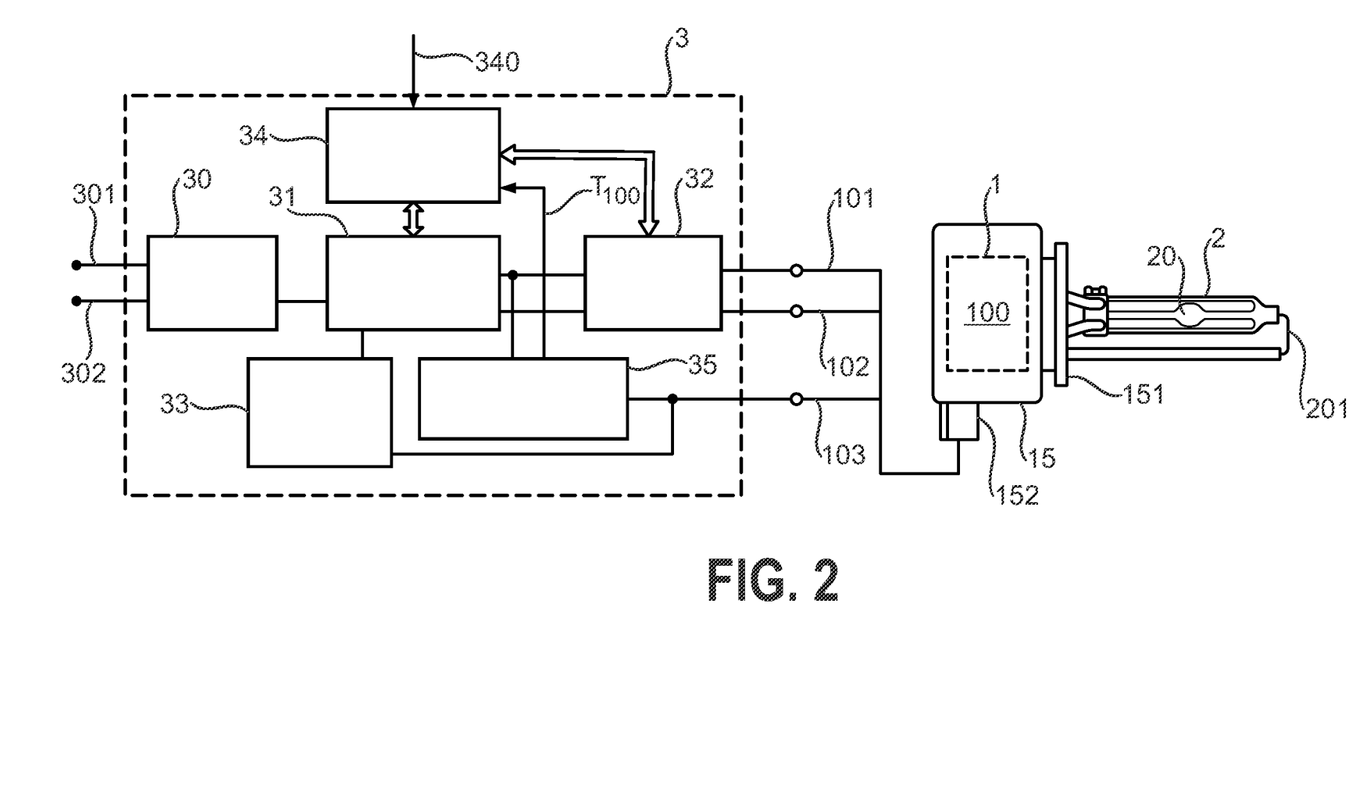
FIG. 2 shows an embodiment of a lamp driver according to the invention.

The inventor realised that a thermistor 10 could be used as a discharge resistor 10, so that its discharge function can still be fulfilled, while the temperature dependency of the thermistor's resistivity could be used to good effect in order to determine the temperature in the interior 100 of the ignitor housing. A lamp driver is connected to the ignitor arrangement 1 via the terminals 101, 102, 103, and can measure the thermistor resistivity by applying an appropriate voltage across the first input terminal pair 101, 102 even during normal steady-state operation of the lamp 2, since the first terminal 101 is shared and the ignition terminal 102 is not required during steady-state operation. FIG. 2 shows an embodiment of a lamp driver 3 according to the invention connected to the ignitor arrangement 1 of FIG. 1, to which an HID lamp 2 is securely mounted by means of a lamp interface 151. The diagram shows that the known type of connection interface 152 between ignitor arrangement 1 and lamp driver 3 need not be changed in any way. The lamp driver 3 can be connected to an external power source (not shown) by means of terminals 301, 302 and comprises the usual arrangement of functional units, namely an input circuit 30 for lamp driver protection and for filtering the higher frequencies that are generated by a DC-DC converter; a DC-DC converter 31 for converting the input voltage to a suitable level; a DC-AC converter 32 for generating a low-frequency square wave in the range of 200-1000 Hz; and an auxiliary ignition module 33 for applying a suitable DC voltage across the first pair of input terminals 101, 102 to the ignition arrangement 1. The lamp driver 3 also comprises a control circuit 34 for regulating the power applied to the lamp during steady-state operation. In this exemplary embodiment, the control unit 34 is provided with an additional control input 340 to allow the lamp power to be adjusted as desired by an external module (not shown). In this exemplary embodiment of the lamp driver 3 according to the invention, an additional module 35 is realised as a temperature evaluation unit 35, whose function is to determine or estimate the temperature in the interior 100 of the ignitor housing 15. Since the spark gap is non-conductive during steady-state operation, the only current path available between the first terminal 101 and the ignition terminal 102 is through the discharge resistor. The ignition terminal 102 is not required during the steady-state operation of the lamp 2, so that the temperature evaluation unit 35 can incorporate the thermistor 10 into an evaluation circuit to which a known voltage is applied, and the resulting voltage can be measured between the ignition terminal 102 and another suitable node. The temperature evaluation unit 35 can then calculate the momentary resistance of the thermistor 10, estimate the momentary temperature $T_{100}$ in the ignitor interior 100, and provide the control unit with a value of the estimated temperature $T_{100}$.

Figure 3:
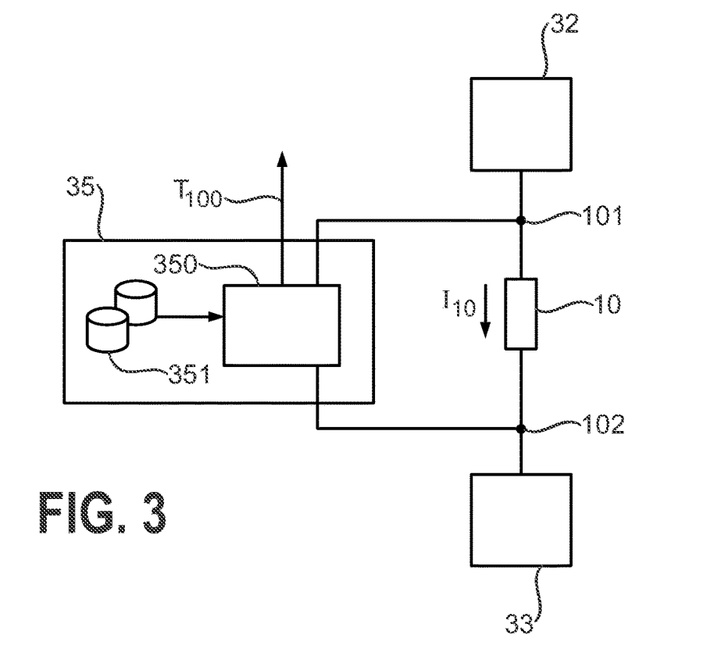
FIG. 3 shows a first embodiment of a temperature evaluation unit in the lamp driver of FIG. 2.

FIG. 3 shows an embodiment of a temperature evaluation unit 35 for the lamp driver shown in FIG. 2. The simplified diagram only indicates the relevant elements of the lamp driver 3, and only the thermistor 10 of the ignitor arrangement 1 is shown. During steady-state operation, a low-frequency square wave is applied across the drive terminals 101, 103 of the ignitor as shown in FIG. 1. During one half-wave, which can persist for several milliseconds, the voltage at the shared terminal 101 is essentially constant. During this time, the current $I_{10}$ through the thermistor 10 can be measured without interfering with the operation of the lamp.

Here, the temperature evaluation unit 35 makes use of the fact that a known voltage is applied to the terminals 101, 102 by the DC-AC converter 32 and the auxiliary ignition module 33. In this exemplary embodiment, the temperature evaluation unit 35 comprises a current monitoring unit 350 which can measure the current $I_{10}$ through the thermistor 10. A memory 351 storing a look-up table relating current values to temperature values is included in the temperature evaluation unit 35. In this way, an estimated temperature value $T_{100}$ can quickly be obtained and forwarded to the control circuit of the lamp driver.

Figure 4:
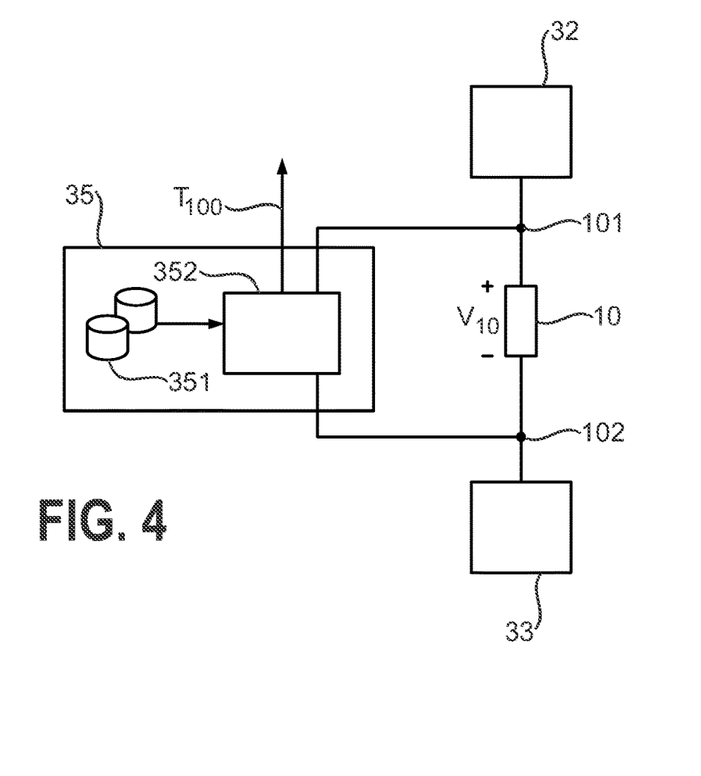
FIG. 4 shows a second embodiment of a temperature evaluation unit in the lamp driver of FIG. 2.

FIG. 4 shows another embodiment of a temperature evaluation unit 35 for the lamp driver of FIG. 2. Again, this simplified diagram only indicates the relevant elements of the lamp driver 3, and only the thermistor 10 of the ignitor arrangement 1 is shown. In this exemplary embodiment, the temperature evaluation unit 35 comprises a voltage monitoring unit 352 which can measure the voltage $V_{10}$ across the thermistor 10. Here also, a memory 351 storing a look-up table is used, in this case a look-up table relating voltage values to temperature values. The estimated temperature value $T_{100}$ is again forwarded to the control circuit of the lamp driver.

Figure 5:
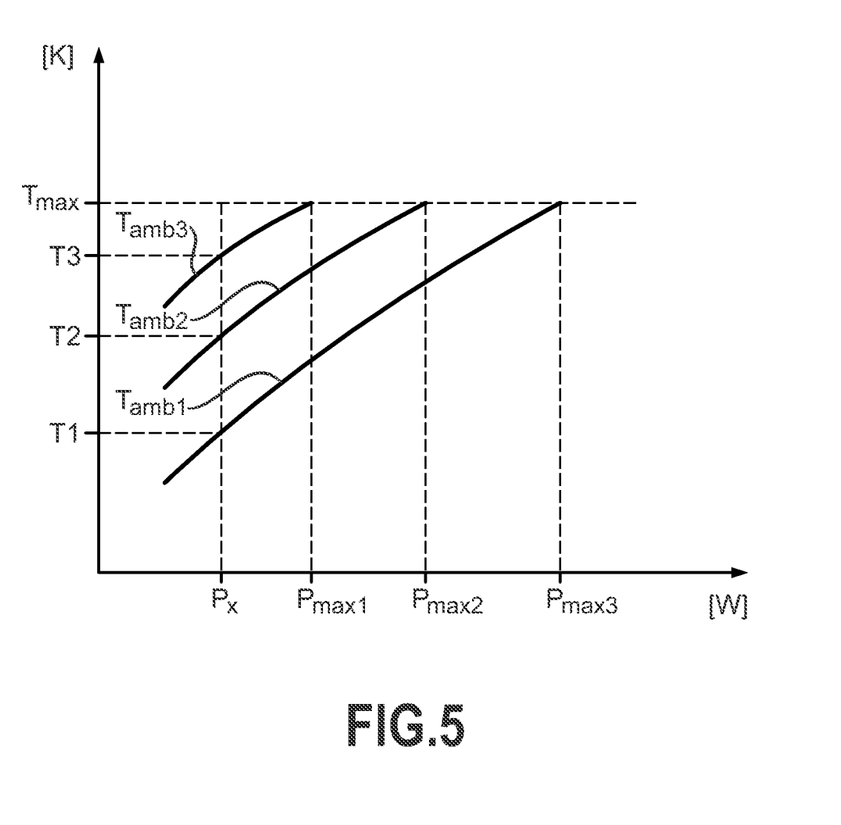
FIG. 5 shows graphs of ignitor temperature vs. lamp power for different ambient temperatures.

As mentioned above, the temperature in the ignitor housing will be affected to some extent by the ambient temperature. This in turn can affect the power levels at which the lamp can be driven. FIG. 5 shows graphs of ignitor temperature (in degrees Kelvin) vs. lamp power (in Watt) for three different ambient temperatures $T_{amb1}$, $T_{amb2}$, $T_{amb3}$. The lowest ambient temperature $T_{amb1}$ is associated with the highest maximum lamp power $P_{max3}$, while the highest ambient temperature $T_{amb3}$ is associated with the lowest maximum lamp power $P_{max1}$. The maximum ignitor temperature $T_{max}$ is essentially constant, since this is the temperature above which the ignitor components may suffer damage. A typical maximum ignitor temperature is about 150° C. The control unit of the lamp driver according to the invention will regulate the lamp power such that the temperature within the ignitor housing does not exceed this maximum ignitor temperature $T_{max}$. Since the temperature in the ignitor housing depends to some extent on the ambient temperature, the temperature in the ignitor can be different for different ambient temperatures even if the lamp power is the same in each case. Here, an exemplary power level $P_x$ is associated with three different interior ignitor temperatures $T_1$, $T_2$, $T_3$. These different temperatures might be observed in the interior of an ignitor when used in a relatively cold environment; a 'normal' environment, and a relatively hot environment, respectively. Therefore, the maximum power $P_{max1}$, $P_{max2}$, $P_{max3}$ at which the lamp can be driven depends also on the ambient temperature $T_{amb1}$, $T_{amb2}$, $T_{amb3}$, and a lamp driver according to the invention can take this into account by regulating the lamp power in response to an estimated ignitor interior temperature as described above.

Figure 6:
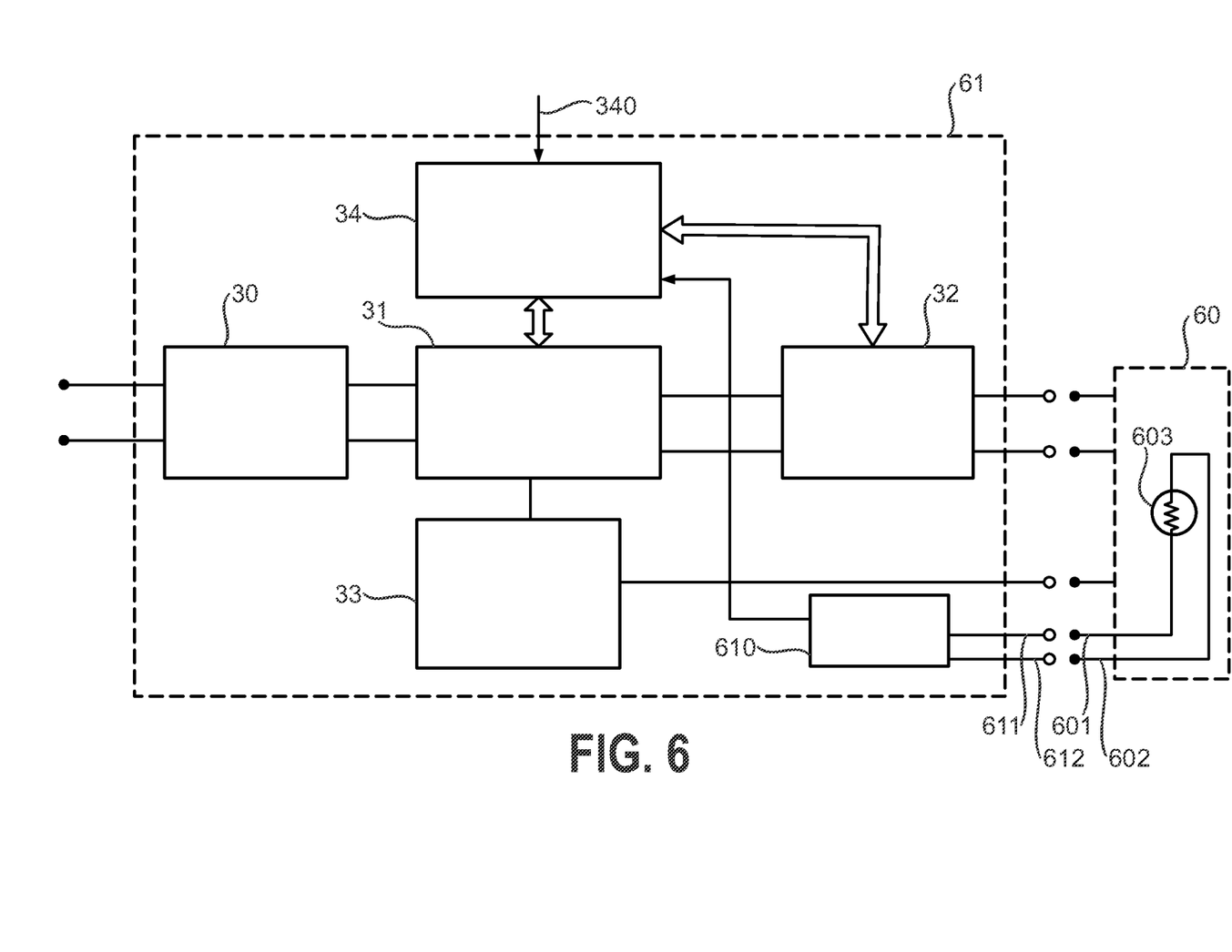
FIG. 6 shows a prior art arrangement with a lamp driver and a lighting arrangement incorporating an asymmetrical ignitor.

FIG. 6 shows a prior art arrangement with an asymmetrical ignitor 60 for connecting to a lamp driver 61. The lamp driver 61 comprises most of the modules 30, 31, 32, 33, 34 already described above. Here, a temperature sensor 603 is arranged inside the asymmetrical ignitor 60 so that it is in close proximity to the components of the ignitor 60, for example close to the conventional fixed-value discharge resistor or to the ignition capacitor. To access feedback from the temperature sensor 603, electrical connections 601, 602 are required. The driver 61 also needs corresponding connections 611, 612 so that some suitable temperature evaluation module 610 can obtain the feedback and evaluate it. The necessity of altering the known driver and ignitor designs to accommodate the temperature sensor 603 and the electrical connections 601, 602, 611, 612 result in an increased overall cost and a reduction in compatibility.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A system including an ignitor arrangement for a high-intensity discharge lamp and a lamp driver realized to drive the high-intensity discharge lamp via the ignitor arrangement, the ignitor arrangement comprising:
a first pair of input terminals for applying an ignition voltage to the ignitor arrangement;
a second pair of input terminals for applying an input drive voltage to the ignitor arrangement;
an ignition capacitor; and
a discharge resistor connected in parallel with the ignition capacitor and for discharging the ignition capacitor, the discharge resistor being arranged in an interior of the ignitor arrangement and connected across the first input terminal pair, the discharge resistor further being a temperature-dependent resistor having a resistance that depends on a temperature ($T_{100}$) in the interior of the ignitor arrangement, wherein the first pair of input terminals comprises an ignition terminal that is not shared with the second pair of input terminals and is not used for the input drive voltage, and the lamp driver comprising:
ignition circuitry realized to apply the ignition voltage across the first pair of input terminals of the ignitor arrangement;
drive circuitry realized to apply the input drive voltage across the second pair of input terminals of the ignitor arrangement;
a temperature evaluation unit realized to determine the temperature ($T_{100}$) in the interior of the ignitor arrangement, such determination comprising measuring a resistance of the temperature-dependent discharge resistor of the ignitor arrangement during a steady-state operation of the high-intensity discharge lamp; and
a control unit for regulating an operating power of the high-intensity discharge lamp on basis of the temperature ($T_{100}$) in the interior of the ignitor arrangement.

2. The system according to claim 1, wherein the temperature-dependent discharge resistor comprises any of: a negative temperature coefficient thermistor; a positive temperature coefficient thermistor; and a silistor.

3. The system according to claim 1, wherein the temperature-dependent discharge resistor is chosen on the basis of a temperature in the ignitor interior at a nominal lamp power.

4. The system according to claim 1, further comprising a housing incorporating electrical components of the ignitor arrangement and the lamp driver, wherein the housing comprises a lamp interface for connecting to the high-intensity discharge lamp.

5. The system according to claim 1, wherein the temperature evaluation unit is realized to measure a current ($I_{10}$) through the temperature-dependent discharge resistor of the ignitor arrangement and to measure the resistance of the temperature-dependent discharge resistor on basis of the measured current ($I_{10}$).

6. The system according to claim 1, wherein the temperature evaluation unit is realized to measure a voltage ($V_{10}$) across the temperature-dependent discharge resistor of the ignitor arrangement and to measure the resistance of the temperature-dependent discharge resistor on basis of the measured voltage ($V_{10}$).

7. The system according to claim 1, wherein the control unit is realized to continuously monitor the temperature ($T_{100}$) in the interior of the ignitor arrangement.

8. A method of driving the high-intensity discharge lamp via an ignitor arrangement for a high-intensity discharge lamp, the ignitor arrangement comprising:
a first pair of input terminals for applying an ignition voltage to the ignitor arrangement;
a second pair of input terminals for applying an input drive voltage to the ignitor arrangement;
an ignition capacitor; and
a discharge resistor connected in parallel with the ignition capacitor and for discharging the ignition capacitor, the discharge resistor being arranged in an interior of the ignitor arrangement and connected across the first input terminal pair, the discharge resistor further being a temperature-dependent resistor having a resistance that depends on a temperature ($T_{100}$) in the interior of the ignitor arrangement, wherein the first pair of input terminals comprises an ignition terminal that is not shared with the second pair of input terminals and is not used for the input drive voltage, the method comprising the steps of:

connecting the high-intensity discharge lamp to the ignitor arrangement;

applying the ignition voltage across the first pair of input terminals of the ignitor arrangement in order to ignite the high-intensity discharge lamp;

applying, after ignition, the input drive voltage across the second pair of input terminals of the ignitor arrangement;

determining the temperature ($T_{100}$) in the interior of the ignitor arrangement, such determination comprising measuring a resistance of the temperature-dependent discharge resistor across the first pair of input terminals of the ignitor arrangement during a steady-state operation of the high-intensity discharge lamp; and regulating an operating power of the high-intensity discharge lamp on basis of the temperature ($T_{100}$) in the interior of the ignitor arrangement.

9. The method according to claim 8, wherein measuring the resistance of the temperature-dependent discharge resistor comprises measuring a current ($I_{10}$) through the temperature-dependent discharge resistor of the ignitor arrangement during the steady-state operation of the high-intensity discharge lamp.

10. The method according to claim 8, wherein measuring the resistance of the temperature-dependent discharge resistor comprises measuring a voltage ($V_{10}$) across the temperature-dependent discharge resistor of the ignitor arrangement during the steady-state operation of the high-intensity discharge lamp.

11. The method according to claim 8, wherein the input drive voltage comprises a low-frequency square-wave voltage, and the step of determining the temperature ($T_{100}$) in the interior of the ignitor arrangement is performed during one half cycle of the input drive voltage.

12. The method according to claim 8, wherein the step of regulating the operating power is performed such that the temperature ($T_{100}$) in the interior of the ignitor arrangement is maintained below an upper temperature limit ($T_{max}$).

13. A system including a lamp driver realized to drive a high-intensity discharge lamp via an ignitor arrangement, the lamp driver comprising:

ignition circuitry realized to apply an ignition voltage across a first pair of input terminals of the ignitor arrangement to charge an ignition capacitor connected across the first pair of input terminals, the first pair of input terminals comprising an ignition terminal used during ignition of the high-intensity discharge lamp;

drive circuitry realized to apply an input drive voltage across a second pair of input terminals of the ignitor arrangement, the second pair of input terminals not including the ignition terminal;

a temperature evaluation unit realized to determine a temperature ($T_{100}$) in an interior of the ignitor arrangement, such determination comprising measuring a resistance of a temperature-dependent discharge resistor during a steady-state operation of the high-intensity discharge lamp, and the temperature-dependent discharge resistor being arranged in the interior of the ignitor arrangement and connected across the first pair of input terminals of the ignitor arrangement and serving for discharging the ignition capacitor; and a control unit for regulating an operating power of the high-intensity discharge lamp on basis of the temperature ($T_{100}$) in the interior of the ignitor arrangement.

14. The system according to claim 13, wherein the temperature evaluation unit is realized to measure a current ($I_{10}$) through the temperature-dependent discharge resistor in the ignitor arrangement and to measure the resistance of the temperature-dependent discharge resistor based on the current ($I_{10}$) measured.

15. The system according to claim 13, wherein the temperature evaluation unit is realized to measure a voltage ($V_{10}$) across the temperature-dependent discharge resistor in the ignitor arrangement and to measure the resistance of the temperature-dependent discharge resistor based on the voltage ($V_{10}$) measured.

16. The system according to claim 13, wherein the control unit is realized to continuously monitor the temperature ($T_{100}$).

* * * * *